Nov. 9, 1926.  1,606,625
A. GRANDJEAN
CONTINUOUSLY FED APPARATUS FOR WEIGHING VARIOUS MATERIALS IN BULK
Filed Sept. 4, 1923
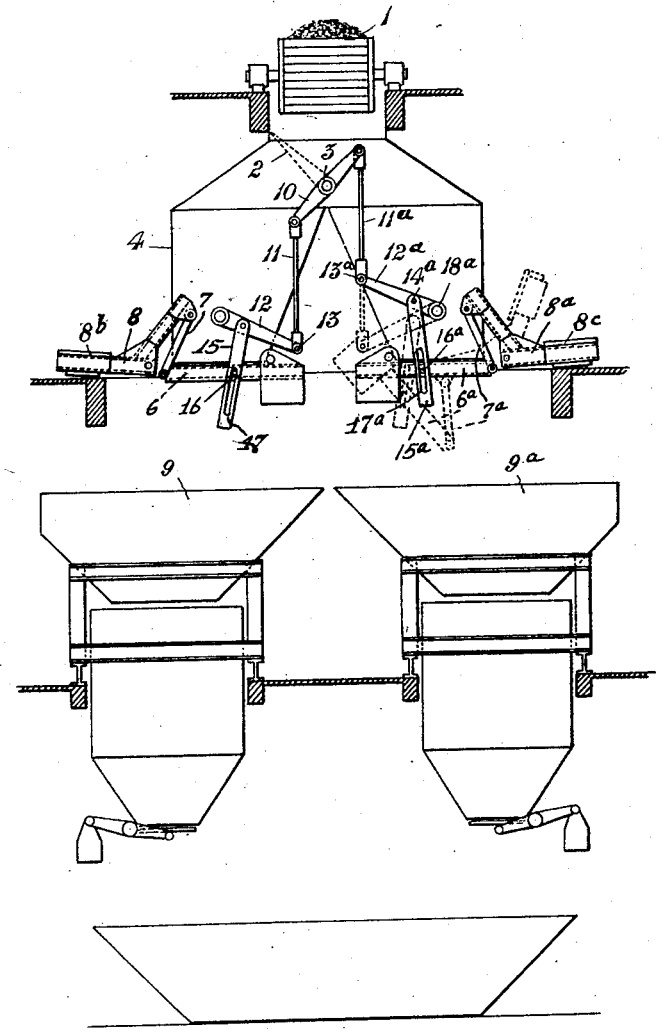
Inventor:—
Adolphe Grandjean
by George T. Folkes.
his Attorney.

Patented Nov. 9, 1926.

1,606,625

UNITED STATES PATENT OFFICE.

ADOLPHE GRANDJEAN, OF PARIS, FRANCE, ASSIGNOR TO W. & T. AVERY, LIMITED, OF BIRMINGHAM, ENGLAND.

CONTINUOUSLY-FED APPARATUS FOR WEIGHING VARIOUS MATERIALS IN BULK.

Application filed September 4, 1923, Serial No. 660,852, and in France September 6, 1922.

This invention has reference to a continuous feed apparatus for weighing various materials in bulk and refers particularly to that type of apparatus wherein two hoppers or compartments are alternately filled from a conveyor or other supply the alternation of feed being governed by means of an oscillating flap or deflection chute; the said flap or chute being interconnected with the means governing the discharge outlets of the hoppers or compartments whereby the flap or chute directs the material to be weighed into the hopper or compartment the outlet of which is closed, the outlet of the other hopper or compartment being meanwhile in the discharging condition.

Several constructions of apparatus of this character have been employed for dealing with materials more especially of a dry granular nature, where owing to the uniformity of size and weight of the elements of the material it is a relatively simple matter to provide a continuous and automatic supply to the weighing apparatus. Such apparatus however has hitherto been found unsuitable for dealing with coal, breeze, slack or other materials wherein the elements are of a non-uniform character in size and weight, it being found essential to stop the apparatus for the periods of time necessary to permit the weighing apparatus to attain the requisite degree of equilibrium necessary for accurate weighment and to permit the parts of the apparatus to function.

The present invention has for its object the provision of an apparatus capable of continuous and automatic working with material such as coal, breeze, slack or the like and which operates with a considerable degree of accuracy and speed in relation to the material being dealt with.

The invention consists of a continuous feed apparatus for weighing materials in bulk comprising in combination a continuous conveyor adapted to feed material to one or the other compartment of a divided hopper the entrance to which is determined by a pivoted deflection chute controlled by means of its connection to two separate counterweighted outlet valve controlled lever mechanisms connected to said hopper, said hopper compartments delivering intermittently and alternately the material received therein to one or other of two alternately-acting weighing mechanisms which in turn deliver the material after weighment to a common receptacle.

The invention will now be described with particular reference to the accompanying drawing which is a diagrammatic representation of the invention.

Coal or like material is discharged from a conveyor 1 into one or other compartment 4 or 5 of the supply hopper according to the position of a deflection chute 2 which is adapted to close alternately the inlet to one or other of the compartments 4 and 5.

The outlets of the hopper compartments 4 and 5 are closed by valves 6, 6ª pivoted to the hopper, the valve 6, 6ª being connected by means of pivotal links 7, 7ª to cranked levers 8, 8ª having adjustable counterweights 8ᵇ and 8ᶜ mounted thereon respectively. The valves 6, 6ª are provided adjacent their pivots with enlarged parts 6ᵇ, 6ᶜ respectively which serve as counterweights and permit of a balanced motion of the said valves 6, 6ª. These counterweights 8ᵇ and 8ᶜ may be set on the levers 8, 8ª so that the valves 6, 6ª will open when a predetermined amount has accumulated within one or other of the hopper compartments 4, 5. The material from each compartment is alternately discharged into the supply hopper 9 or 9ª of weighing apparatus of known construction wherein an accurate weighment of the material discharged thereinto is made.

The deflection chute 2 is mounted on a spindle 3 which serves as a pivot for a rocking lever 10 to the ends of which are pivoted rods 11, 11ª which are pivotally connected at their lower end by pins 13, 13ª to levers 12, 12ª mounted at their outer ends 18, 18ª to the sides of the hopper. By means of pins 14, 14ª the levers 12, 12ª are pivotally connected to links 15, 15ª said links being formed with slots 16, 16ª within which engage pins 17, 17ª which are secured to the valves 6, 6ª of the hopper compartments 4 and 5. The lost motion linkage constituted by the pins 17, 17ª and the slots 16, 16ª ensures that the valves 6, 6ª are open before the chute 2 completely closes the inlet to the respective hopper compartment.

Assuming the deflection chute 2 initially to be in the position seen in the drawing the operation of the apparatus is as follows: The material is fed into the hopper compartment 5 until the amount therein is sufficient to counterbalance the predetermined setting of the counterweight $8^c$. The valve $6^a$ of the hopper compartment 5 opens under the load and discharges the material into the supply hopper $9^a$ of the weighing apparatus whereby an accurate weighment of the load is made. As the valve $6^a$ opens the pin $17^a$ secured thereto moves downwardly in its slot $16^a$ in the link $15^a$ and bearing against the end of the slot $16^a$ draws the link $15^a$ downwardly thereby rocking the lever $12^a$ about its pivot $18^a$, the lever $12^a$ being pulled downwardly and through the rod $11^a$ rocks the lever 10 about its pivot thereby turning the deflection chute 2 through an angle of say 90 degrees and closing the inlet to the compartment 5. The material is thus directed into the hopper compartment 4, the valve 6 of which is closed, and when sufficient material has accumulated in the hopper compartment 4 its valve 6 opens and discharges into the supply hopper 9 of the weighing apparatus the deflection chute 2 then being rotated so as to close the inlet to the hopper compartment 4 and to open the inlet to the hopper compartment 5 when a like sequence of operations is repeated.

It will be seen that this alternate feed to one or other of the hopper compartments 4 and 5 from the conveyor 1 is continuous and the operation of the mechanism permits of accurate weighments being made by the weighing apparatus into which the material from the hopper compartments 4 and 5 is discharged.

Claims:

1. In continuous feed apparatus for weighing materials in bulk of the kind referred to, the combination of a continuous conveyor, a stationary two-part hopper to one or other compartments of which the material is fed by said conveyor, a pivoted chute controlling the inlet to each compartment, two separate counterweighted outlet valves controlling the outlets of said compartments, duplicated lever mechanism connected to said valves and to the pivoted chute, said lever mechanism determining the motion of said chute, and two alternately acting weighing machines adapted to receive, weigh and deliver the material fed thereto from one or other of the compartments of the stationary hopper.

2. In continuous feed apparatus for weighing materials in bulk of the kind referred to, the combination of a continuous conveyor, a stationary two-part hopper to one or other compartment of which the material is fed by said conveyor, a pivoted chute controlling the inlet to each compartment, two separate counterweighted outlet valves controlling the outlets of said compartments, duplicated lever mechanism connected to said valves and to the pivoted chute said lever mechanism determining the motion of said chute, two alternately acting weighing machines adapted to receive, weigh and deliver the material fed thereto from one or other of the compartments of the stationary hopper and a pin and slot lost motion linkage in the said lever mechanism to provide an intermittent feed of the weighing material to the weighing machines and an uninterrupted operation of the said machines.

In testimony whereof, I have signed my name to this specification.

ADOLPHE GRANDJEAN.